United States Patent [19]

Mayumi et al.

[11] Patent Number: 4,692,357

[45] Date of Patent: Sep. 8, 1987

[54] PRIMER COMPOSITION FOR OLEFIN RESIN

[75] Inventors: Junji Mayumi; Riichiro Maruta, both of Mie, Japan

[73] Assignee: Mitsubishi Petrochemical Co., Ltd., Tokyo, Japan

[21] Appl. No.: 908,956

[22] Filed: Sep. 18, 1986

Related U.S. Application Data

[62] Division of Ser. No. 831,506, Feb. 21, 1986, abandoned.

[30] Foreign Application Priority Data

Feb. 21, 1985 [JP] Japan .................................. 60-33199

[51] Int. Cl.$^4$ .......................... B05D 3/02; B05D 1/36
[52] U.S. Cl. ............................. 427/393.5; 427/407.1; 524/502; 524/539
[58] Field of Search ............................. 524/502, 539; 427/393.5, 407.1

[56] References Cited

U.S. PATENT DOCUMENTS

| | | | |
|---|---|---|---|
| 2,486,804 | 11/1949 | Seymour et al. ..................... | 524/502 |
| 4,124,654 | 11/1978 | Abolins et al. ....................... | 525/93 |
| 4,243,766 | 1/1981 | Abolins et al. ....................... | 525/96 |
| 4,269,950 | 5/1981 | Abolins et al. ....................... | 525/74 |
| 4,341,837 | 7/1982 | Katsuto et al. ...................... | 525/288 |
| 4,508,874 | 11/1983 | Hergenrother et al. . | |
| 4,542,179 | 9/1985 | Falk et al. ............................ | 525/74 |

Primary Examiner—Joseph L. Schofer
Assistant Examiner—N. Sarofim
Attorney, Agent, or Firm—Oblon, Fisher, Spivak, McClelland, & Maier

[57] ABSTRACT

A primer composition for olefin resins is disclosed, comprising Components (A) and (B):
(A): a resin having an acid group prepared by graft polymerizing $\alpha,\beta$-unsaturated carboxylic acid or its anhydride onto a styrene-butadiene-styrene block copolymer or its hydrogenated product.
(B): an organic solvent capable of dissolving the resin of Component (A).

11 Claims, No Drawings

PRIMER COMPOSITION FOR OLEFIN RESIN

This application is a division of application Ser. No. 831,506, filed Feb. 21, 1986, now abandoned.

FIELD OF THE INVENTION

The present invention relates to a primer composition for olefin resin. More particularly, it relates to a primer composition which is coated on the surface of moldings, e.g., a car bumper, a side molding, and an instrument panel, made of olefin resins not having a polar group, such as polypropylene, polyethylene, polystyrene, an ethylene-propylene copolymer rubber, an ethylene-propylene-ethylidene norbornane copolymer rubber, a styrene-butadiene-styrene block copolymer and its hydrogenated product prior to coating the surface with paints such as a melamine resin paint, an acryl-urethane resin paint, and a urethane resin paint.

BACKGROUND OF THE INVENTION

Non-polar olefin resins such as polypropylene, polyethylene, an ethylene-propylene copolymer rubber, and a styrene-butadiene-styrene block copolymer are inexpensive and have excellent resistance to organic solvent, and are used in production of car exteriors such as a bumper and a side molding. These resins are used alone or in combination with each other as described, for example, in Japanese Pat. Application Nos. 134106/84 and 154570/84.

These resins, however, are poor in weathering properties. To improve such poor weathering properties, paint coating is applied on the surface of moldings, or a ultraviolet absorber and pigments such as titanium oxide and carbon black are compounded to the resin and the resulting mixture is kneaded and molded to obtain a product.

In the case of production of large-sized molded particles having a large thickness, the above latter method is not advantageous in that large amounts of expensive ultraviolet absorbers and pigments are necessary to compound. Therefore the above former method to coat the surface of molded articles is suitable for practical use. However, since the olefin resins are composed of non-polar elements such as hydrogen and carbon, it is difficult to adhere the paint directly to the resins. For this reason, the surface of molded articles is generally subjected to oxidation treatment such as treatment using chemicals, plasma treatment and flame treatment, or a primer composed mainly of chlorinated polypropylene, maleic anhydride-grafted polypropylene, and maleic anhydride-modified chlorinated polypropylene is coated and dried to form an overcoating.

With conventional primers, however, the adhesion between the olefin resins and the coating is not sufficiently high; they have a disadvantage in that the coating is peeled off from the molded articles during use, resulting in reduction of the appearance.

SUMMARY OF THE INVENTION

It has been found that the above problems can be overcome by using a primer containing an $\alpha, \beta$-unsaturated carboxylic acid-grafted styrene-butadiene-styrene block copolymer or its hydrogenated product.

Accordingly, an object of the present invention is to provide a primer composition for olefin resins, comprising:

Component (A): a resin having an acid group obtained by graft polymerizing $\alpha, \beta$-unsaturated carboxylic acid or its anhydride onto a styrene-butadiene-styrene block copolymer or its hydrogenated product; and Component (B): an organic solvent capable of dissolving the component (A), wherein the component (A) is dissolved in the component (B).

DETAILED DESCRIPTION OF THE INVENTION

Olefin resins which are molded into articles such as a car bumper, a side molding, and an instrumental panel include polymers having high stiffness such as crystalline polypropylene, polyethylene, random or block copolymers of propylene and olefins such as ethylene, butene-1 and 4-methylpentene, and polystyrene; and polymers having high elasticity such as an ethylene-propylene copolymer rubber, an ethylene-propylene-ethylidene norbornane copolymer rubber, and a block copolymer represented by the formula (I): A-(B-A)$_n$(wherein A is a polymer block of a monovinyl-substituted substituted aromatic hydrocarbon, B is an elastomer block of a conjugated diene, and n is integer of 1 to 5) or its hydrogenated product. Depending on the purpose of use, these olefin resins are used alone, or the resin having high elasticity is mixed with the resin having high stiffness in an amount of 40 to 300 parts by weight per 100 parts by weight of the resin having high stiffness.

The total proportion of the block A in the block polymer represented by the above-described formula (I) is in a range of about 20 to 50% based on the total weight of the polymer.

The block copolymer can also be represented by the formula: $(SSS)_n$-$(BBB)_n$-$(SSS)_n$(wherein S indicates a portion derived from a vinyl-substituted aromatic hydrocarbon monomer (the vinyl substituent is linked to a carbon atom of the nucleus), and B indicates a portion derived from a conjugated diene monomer). As the monovinyl aromatic hydrocarbon element, styrene is usually used, and as the conjugated diene element, 1,3-butadiene and isoprene are most widely used. For example, as the styrene-butadiene-styrene block polymer, Kraton 1101 and 1102 (trade names) are commercially available, and as the styrene-isoprene-styrene block polymer, Kraton 1107 and 1111 (trade names) are commercially available. These polymers are all sold by Shell Chemical Co.

Production of these block polymers are well known, and a typical method of production is described in U.S. Pat. No. 3,257,765 Aug. 9, 1966). A solution polymerization of a monovinyl aromatic hydrocarbon monomer/conjugated diene monomer mixture in the presence of a catalyst represented by the formula: $R(Li)_x$- (wherein x is an integer of 1 to 4, and R is a hydrocarbon radical selected from aliphatic, alicyclic and aromatic radicals) can also be used.

Hydrogenation of an intramolecular double bond of a styrene-conjugated diene block copolymer provides an elastomer having increased heat stability. A method of the production of such hydrogenated block copolymers is described in Japanese Patent Publication Nos. 8704/67, 6636/68, 20504/70, 3555/73, and so forth. Several compositions containing such hydrogenated products are disclosed. For example, Japanese Patent Application (OPI) Nos. 14742/75, 65551/77 (the term "OPI" as used herein means a "published unexamined Japanese patent application"), and Japanese Patent Publication No. 4225/85 disclose compositions comprising a hydrogenated styrene-conjugated diene monomer block copolymer and compounded thereto a hydrocarbon oil, a rosin ester tackifier and an α-olefin polymer, wax, an ethylene-vinyl acetate copolymer or the like.

These hydrogenated products are sold by Shell Chemical Co. under the trade name of, e.g., Kraton G-1652.

High stiffness olefin resins having good compatibility with the above-described hydrogenated products include a propylene-ethylene block copolymer having a MFR (Melt Flow Rate: as determined at 230° C.) of 1 to 50 g/10 min., a propylene-butene block copolymer, and a propylene ethylene-butene block copolymer. In order to further increase the compatibility of the two components, it is preferred to compound an ethylene-α-olefin copolymer rubber, particularly an amorphous random copolymer rubber comprising an ethylene-α-olefin and conjugated diene together with the above-described propylene-α-olefin block copolymer to the hydrogenated styrene-butadiene-styrene copolymer.

Examples of the α-olefin which can be used in the copolymer rubber are propylene, butene-1, and hexene-1. Examples of the conjugated diene are dicyclopentadiene, 1,4-hexadiene, cyclooctadiene, methylnorbornene, and ethylidenenorbornene.

As the copolymer rubbers, those using propylene as the α-olefin are preferred. In this case, the appropriate propylene content is from 25 to 50 wt %. If the propylene content is too small, the resulting composition has poor flexibility. On the other hand, if the propylene content is too high, the mechanical strength of the final molding tends to decrease.

The Mooney viscosity $ML_{1+4}^{100}$ of the copolymer rubber is 10 to 120 and preferably 10 to 100.

The olefin resin is molded into articles such as a bumper, a side lace, and an instrumental panel by molding techniques such as extrusion molding, injection molding and press molding.

These molded articles are subjected to oxidation treatment or degreasing treatment by conventional techniques prior to coating.

The resin having an acid group as the component (A) is prepared by graft polymerizing α,β-unsaturated carboxylic acid or its anhydride onto the above styrene-butadiene-styrene block copolymer or its hydrogenated product in the presence of a radical polymerization initiator.

The preferred graft polymerization method is a method in which the starting materials are melt kneaded in an extruder and radical polymerized, and a method in which a block copolymer is dispersed in an aromatic hydrocarbon solvent such as toluene, xylene, chlorobenzene and benzene with a radical polymerization initiator dissolved therein.

α,β-Unsaturated carboxylic acids or their anhydrides which can be used include acrylic acid, methacrylic acid, maleic acid, itaconic acid, citraconic acid, crotonic acid, fumaric acid, and maleic anhydride. In the case of polybasic acids such as maleic acid and fumaric acid, their half alkyl esters can also be used.

In combination with the α,β-unsaturated carboxylic acid or its anhydride, other vinyl monomers such as acrylonitrile, acrylamide, vinyl chloride, and 2-hydroxyethyl acrylate can be used.

The graft polymer obtained by radical polymerization contains unreacted α,β-unsaturated carboxylic acid or its anhydride. It is therefore preferred to repeatedly wash the graft polymer with toluene or acetone. After washing, the acetone is removed by drying under reduced pressure.

As the radical polymerization initiator, any conventional radical polymerization initiators can be used. Examples thereof are organic peroxides and azonitriles. Representative examples of the organic peroxide are alkyl peroxide, aryl peroxide, acyl peroxide, alloyl peroxide, ketone peroxide, peroxy carbonate, and peroxy carboxylate. Representative examples of the alkyl peroxide are diisopropyl peroxide, di-tert-butyl peroxide, and tert-butyl hydroperoxide. Representative examples of the aryl peroxide are dicumyl peroxide and cumyl hydroperoxide. Representative example of the acyl peroxide is dilauroyl peroxide. Representative example of the alloyl peroxide is dibenzoyl peroxide. Representative examples of the ketone peroxide are methyl ethyl ketone peroxide and cyclohexane peroxide. Representative examples of the azonitrile are azobisisobutyronitrile and azobiisopropionitrile.

The graft polymer thus obtained contains $10^{-7}$ to $10^{-8}$ g equivalents of a carboxyl group resulting from α,β-carboxylic acid, per gram of the block polymer. The α,β-unsaturated carboxylic acid is generally grafted such that the proportion of the α,β-unsaturated carboxylic acid in the block copolymer is from 0.01 to 10 wt %.

The resin containing an acid group as the component (A) can be diluted with a hydrogenated styrene-butadiene-styrene copolymer. In addition, chlorinated rubber, chlorinated polypropylene and its maleic anhydride graft adduct, chlorinated polyethylene and its maleic anhydride adduct, and so forth can be used in combination with the component (A). In particular, if 10 to 99 wt % of the maleic anhydride-grafted chlorinated polypropylene and 90 to 1 wt % of the component (A) are compounded, the adhesion force to the coating is greatly increased.

In order to increase the resistance to gasoline of the coating, an epoxy compound can be compounded, or the component (A) can be further grafted with an epoxy compound, or hydroxyethyl acrylate or hydroxypropyl acrylate.

The organic solvent as the component (B) to dissolve the resin of the component (A) includes aromatic hydrocarbons such as toluene, xylene and chlorobenzene, tetralines, and mineral spirit.

The amount of the organic solvent used is determined so as to facilitate the coating of the primer. The resin composition of the present invention comprises 5 to 50 wt % of the component (A) and 95 to 50 wt % of the component (B), and preferably 6 to 30 wt % of the component (A) and 94 to 70 wt % of the component (B).

The amount of the primer coated on the surface of molding is determined such that the thickness of the resulting coating is 3 to 50 μm. That is, coating of the primer is carried out by techniques such as spray coating, brush coating, and roll coating such that the resin solids content is 3 to 50 g/m². The primer is half dried or completely dried. Thereafter the paint is coated on the primer coating.

Paints which can be used include a melamine hardening-type amino resin, an acryl urethane resin, a urethane resin, an acryl resin, and an unsaturated polyester resin.

The present invention is described in greater detail with reference to the following examples. Unless otherwise indicated, all percents, parts, ratios and the like are by weight.

Production of Molding

PRODUCTION EXAMPLE 1

25 Parts by weight of a hydrogenated styrene-butadiene-styrene block copolymer (Kraton G-1652 (trade name), produced by Shell Chemical Co.), 25 parts by weight of an ethylene (74 wt %)-propylene copolymer having a Mooney viscosity of 32, and 50 parts by weight of a propyleneethylene (7wt%) block copolymer (MFR: 45 g/10 min., produced by Mitsubishi Petrochemical Co., Ltd.) were compounded and mixed using a super mixer (produced by Kawada Seisakusho Co., Ltd.) for 2 minutes. The resulting mixture was kneaded using a PCM twin-screw kneader (produced by Ikegai Tekkousho Co., Ltd.) at 220° C. and then pelletized. Each composition obtained was molded with a screw in-line injection molding machine at 240° C. to produce a test piece having a thickness of 2 mm and a size of 100 cm ×100 cm.

PRODUCTION EXAMPLE 2

A test piece was produced in the same manner as Production Example 1 except that the propylene-ethylene block copolymer was used alone.

Preparation of Resin having Acid Group

PREPARATION EXAMPLE 1

A stainless steel pressure reactor equipped with a thermometer and a stirrer was charged with 1 liter of xylene and 100 g of a hydrogenated styrene-butadiene-styrene copolymer (Kraton G-1652 (trade name), produced by Shell Chemical Co.), and after purging the atmosphere of the reactor with nitrogen gas, the temperature was raised to 125° C. Thereafter, a xylene solution of maleic anhydride (1 g/10 ml) and a xylene solution of dicumyl peroxide (0.15 g/10 ml) were pumped into the reactor through different conduits over 6 hours. The total amounts of maleic anhydride and dicumyl peroxide fed in the reactor were 6.0 g and 0.9 g, respectively. After the reaction was completed, the reaction mixture was cooled nearly to room temperature, and acetone was added. The maleic anhydride-grafted block copolymer was separated by filtration and then washed repeatedly with acetone. When the precipitate after washing was dried, at an elevated temperature under reduced pressure, a white powdery modified resin was obtained. Infrared absorption spectral and neutral titration analyses confirmed that the maleic anhydride content of the modified resin was 3.4 wt %.

PREPARATION EXAMPLE 2

A modified resin having a maleic anhydride content of 5.7 wt % was prepared in the same manner as in Example 1 except that the washing using acetone was not applied. This modified resin contained 2.3 wt % of unreacted maleic anhydride.

PREPARATION EXAMPLE 3

100 Parts of chlorinated polypropylene (Hardlen (trade name), produced by Toyo Kasei Kogyo Co., Ltd.; bonded chlorine content: 30%), 10 parts of maleic anhydride and 300 parts of chlorobenzene were placed in a reactor equipped with a reflux condenser, and dissolved by heating at 110° C. 10 Parts of benzoyl peroxide was then added thereto over 6 hours. After completion of the addition, the mixture was reacted while stirring for 3 hours at the same temperature as above.

After the reaction was completed, the chlorobenzene and unreacted maleic anhydride were distilled away first under atmospheric pressure and then under a reduced pressure of 1 mmHg at 140° C.

The maleic anhydride content of the maleic anhydride-grafted chlorinated polypropylene thus obtained was 8.2 wt %, and the bonded chlorine content was 27.5%. This polypropylene was dissolved in toluene to prepare a solution having a solids content of 16%.

EXAMPLE 1 TO 13, AND COMPARATIVE EXAMPLES 1 TO 3

The surface of each of the moldings obtained in Production Examples 1 and 2 was subjected to degreasing treatment using a vapor of 1,1,1-trichloroethane for 1 minute. A primer having the composition shown in Table below was then spray coated on the each molding surface so as to form a coating having a thickness of 10 μm. This primer was evaluated by the following testing methods.

(1) 180° Peel Test

The molding coated with the primer composition was allowed to stand at room temperature for 10 minutes, and a one pack-type urethane paint (Flexthane 101, produced by Nippon BEE Chemical Co., Ltd.) or an acryl resin paint (Plagoss 3000, produced by Nippon Oil & Fats Co., Ltd.) was spray coated in such a manner that the thickness of the resulting coating was 100 μm. The coating was baked at 120° C. for 30 minutes. The coating thus formed was cut in 10 mm width, and one end of the ribbon-shaped coating strip was turned over in the opposite direction. In this way, the 180° peel test was carried out using an autograph (P-100, produced by Shimazu Seisakusho Co., Ltd.; drawing speed: 20 mm/min.).

(2) Hot Water Resistance Test

The test piece with the primer composition coated thereon was spray coated with the same paint as in (1) so as to form a coating having a thickness of 35 μm, and then baked at 120° C. for 30 minutes. This baked test piece was placed in a water tank maintained at 40° C. for 240 hours. The test piece was then taken out of the water tank. After one hour, the cross-cut test of the coating was conducted. This cross-cut test was as follows:

The coating was traced with a cutter to form 100 of 2 mm ×2 mm lattices and a 24 mm wide adhesive tape (Cellotape (trade name), produced by Nichiban Co., Ltd.) was bonded to the traced surface and then peeled apart from the test piece in a vertical direction relative to the surface of the test piece. The number of lattices (coating pieces) remaining unremoved was counted.

TABLE

| | Substrate Production Example No. | Primer Resin Preparation Example 1 (wt %) | Primer Resin Preparation Example 2 (wt %) | Primer Resin Preparation Example 3 (wt %) | solvent Toluene (wt %) | solvent Xylene (wt %) | Paint Used | Evaluation 180° Peel Strength (g/cm) | Evaluation Number of Paint Pieces Retained in Hot Water Resistance Test |
|---|---|---|---|---|---|---|---|---|---|
| Comparative Example 1 | 1 | — | — | 8.0 | 82.8 | 9.2 | Flexthane 101 | 50 | 0/100 |
| Example 1 | 1 | 0.2 | — | 7.8 | " | " | " | 1380 | 5/100 |
| Example 2 | 1 | — | 0.2 | 7.8 | " | " | " | 1450 | 40/100 |
| Example 3 | 1 | — | 0.6 | 7.4 | " | " | " | 1450 | 100/100 |
| Example 4 | 1 | 1.1 | — | 6.9 | " | " | " | 900 | 100/100 |
| Example 5 | 1 | — | 1.1 | 6.9 | " | " | " | 1280 | 100/100 |
| Example 6 | 1 | 8.0 | — | — | " | " | " | 520 | 100/100 |
| Example 7 | 1 | — | 8.0 | — | " | " | " | 500 | 100/100 |
| Comparative Example 2 | 2 | — | — | 8.0 | " | " | " | 800 | 90/100 |
| Example 8 | 2 | 1.1 | — | 6.9 | " | " | " | 1200 | 100/100 |
| Example 9 | 2 | — | 8.0 | — | " | " | " | 1200 | 100/100 |
| Example 10 | 1 | 1.1 | — | 6.9 | " | " | Plagoss #3000 | 1450 | 100/100 |
| Example 11 | 1 | 4.0 | — | 4.0 | " | " | " | 1300 | 100/100 |
| Comparative Example 3 | 1 | — | — | 8.0 | " | " | " | 300 | 0/100 |
| Example 12 | 1 | 6.7 | — | 1.3 | " | " | Flexthane 101 | 870 | 100/100 |
| Example 13 | 2 | 6.7 | — | 1.3 | " | " | " | 1250 | 100/100 |

While the invention has been described in detail and with reference to specific embodiments thereof, it will be apparent to one skilled in the art that various changes and modifications can be made therein without departing from the spirit and scope thereof.

What is claimed is:

1. A method for coating a polyolefin substrate, consisting of:
   (I) applying to said substrate an acidic-group containing resin prepared by polymerizing an α,β-unsaturated carboxylic acid or its anhydride onto a styrene-butadiene-styrene block copolymer or its hydrogenated product wherein said resin is dissolved in an organic solvent at a resin concentration of 5–50 weight percent, and
   (II) obtaining a coated polyolefin substrate.

2. The method of claim 1, comprising allowing the said composition applied to the polyolefin substrate to dry to form a primer coat, and applying a urethane resin paint or an acrylic resin paint onto the surface of the said primer.

3. The method of claim 1, wherein the concentration of the said resin in the composition is 5 to 50 wt. %.

4. The method of claim 1, comprising using as the said α,β-unsaturated carboxylic acid anhydride, maleic anhydride.

5. The method of claim 1, comprising using a concentration of α,β-unsaturated carboxylic acid or its anhydride in the resin of 0.05 to 10 wt. %.

6. The method of claim 1, wherein the said polyolefin comprises polypropylene, an ethylene-propylene copolymer rubber, or a styrene-butadiene-styrene block copolymer.

7. A method for coating a polyolefin substrate, consisting of applying to the said polyolefin substrate, a composition comprising (A) a mixture of (i) 1 to 90 wt. % of an acidic group-containing resin prepared by graft polymerizing an α,β-unsaturated carboxylic acid or its anhydride onto a styrene-butadiene-styrene block copolymer or its hydrogenated product, and (ii) 99 to 10 wt. % of a maleic anhydride-grafted chlorinated polypropylene, and (B) an organic solvent capable of dissolving (A).

8. The method of claim 7, comprising using a composition in which the concentration of the said resin is 5 to 50 wt. %.

9. The method of claim 7, comprising using a resin in which the said α,β-unsaturated carboxylic acid anhydride is maleic anhydride.

10. The method of claim 7, comprising using a resin in which the concentration of the said α,β-unsaturated carboxylic acid or its anhydride in the resin (A) is 0.05 to 10 wt. %.

11. The method of claim 7, wherein the said polyolefin is polypropylene, an ethylene-propylene copolymer rubber, or a styrene-butadiene-styrene block copolymer.

* * * * *